April 7, 1931.   J. B. KIEFER   1,799,616
MAT FROM WORN OUT TIRES
Filed Dec. 5, 1928
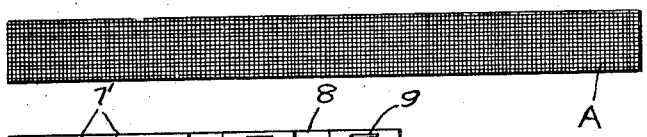
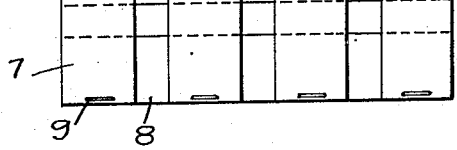
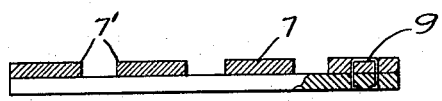
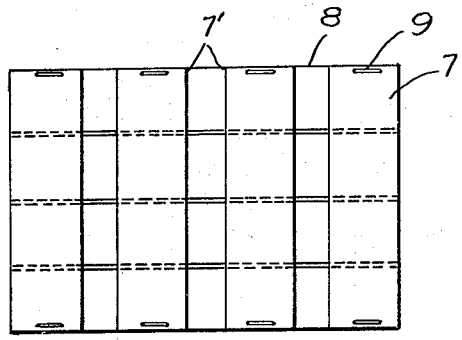
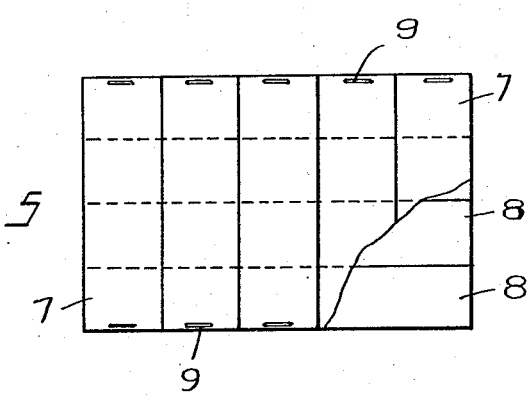
INVENTOR
John. B. Kiefer
BY  F. Ward Kemp
ATTORNEY Patented Apr. 7, 1931

1,799,616

UNITED STATES PATENT OFFICE

JOHN B. KIEFER, OF SEATTLE, WASHINGTON

MAT FROM WORN-OUT TIRES

Application filed December 5, 1928. Serial No. 323,958.

This invention relates to the method or process of producing from worn, or used, automobile tires, serviceable material for further use, and relates particularly to mats and straps and the construction of mats therefrom.

The objects of the invention are to provide a method for utilizing the unworn fabric portion, commonly called the "carcass", of used automobile tires, after the removal of the rim beads, and rubber tread or faces therefrom.

A further object is to divide the carcass into sections of suitable thickness or flexibility, with a plurality of plies of fabric in each section, and without breaking the rubber connection, or bond, between the plies; and then cutting the sections longitudinally into strips from which the lateral tire curves may be easily removed to form flat straps of suitable width for various uses, as for trunk straps, weather strip, mats, etc.

The particular object of the invention is to provide a method for so preparing such straps and for building the same into mats, with a plurality of the straps laid parallel to form an upper section, and a plurality of the straps laid parallel to form a lower section, the straps in the upper section positioned at right angles to the straps in the lower section, and the straps of each section affixed to those of the other section where they cross each other, to provide resilient flexible mats of various designs.

A further object is to provide serviceable straps from such worn automobile tires, and mats therefrom for various uses.

With these and other objects as will herein appear I have illustrated my invention by the accompanying drawings, of which:

Figure 1 shows a top plan of one of the flat straps formed from the carcass portion of a used automobile tire, with the face cross hatched to indicate the top ply of fabric.

Figure 2 represents a plan of a mat formed from the straps placed in rows over each other at right angles, with all straps spaced apart in both the upper and lower set or section thereof.

Figure 3 represents a side elevation of the mats with parts broken away.

Figure 4 represents a second modification of such mats, with the lower row or section of straps adjoining each other, and the upper straps spaced apart from each other.

Figure 5 represents a third modification of such mats, with all the straps in each section adjoining each other, with parts broken away.

For clearness, the indications of fabric are omitted from Figures 2, 3, 4 and 5. Like numerals on the different figures represent like parts.

The increasing use of automobiles, continually creates a large supply of used tires, which are no longer valuable for automobiles; but the carcass portion of many of the tires are practically as good as new for some purposes, and by my methods as described herein, these old tires can be made into serviceable products.

I first remove the rim beads and then clean away the outer rubber wearing faces from the tires, thus leaving the carcass, which is formed of a number of plies or layers A, of cotton fabric, as cloth or cords attached together with layers of rubber between as a binding bond. I then divide the carcass into layers of suitable thickness for the various purposes intended, and then cut the layers into narrower strips or straps, of suitable width, for a required use. After this segregation, the several straps will contain a plurality of the fabric plies, held as an integral body by the rubber enfolding bonds between, and of great strength, and wearing capacity. When so cut into the required widths and thickness the original lateral curve in the strips as formed for the tire use, is readily flattened out.

In the construction of mats from such straps, shown as 7, I arrange any plural number of the straps in parallel lines, and preferably spaced apart sufficiently to provide channels between the same whereby the edges or corners 7' of the straps may be used as scrapers for removing dirt etc., from shoes, without injury to the leather thereof. I then arrange another section of such straps as 8, in similar form, but crosswise or at right angles to the straps 7, and then affix the two sets of straps or sections together by cementing or riveting or other suitable means at points where the straps cross each other. The ends of the straps are preferably securely bound together with binding staples as 9, to prevent any loosening at such points.

Such mats may also be formed with all the straps in the lower section placed adjoining each other, as in Figure 4, thus providing a solid base for the mat, and so preventing any of the scrapings from the shoes from falling through, to injure floors of corridors, or other places where the mats may be placed for use.

Mats of such material may also be formed with the straps of both the upper and lower sections placed adjacent each other, to provide a double solid faced mat, as illustrated in Figure 5. This form is particularly useful on cement floors, and in places where a resilient and wear resisting mat is desired.

All of my forms of mats may be reversed for use of either side, and so provide for long life thereof, with continued flexibility and resiliency. It is also obvious that various other changes in details and design may be used without departing from the spirit of my invention, and I do not therefore limit myself to the specific forms shown.

In the use of the straps for transportation and for adaptation to various construction uses, any number of the straps as shown in Figure 1 are preferably attached together endwise as by cement, to form a continuous strip, and then rolled upon any spool or drum, ribbon wise, from which they may be unwound from any suitable machine or manually for convenient use as required.

Having described my invention, I claim as new for Letters Patent:

1. A mat formed from straps cut from the carcasses of worn automobile tires, comprising two sets of a plurality of such straps of suitable width and thickness for a double mat, the straps in each set respectively arranged parallel with each other but crosswise to the other set, and the two sets attached together one over the other, to provide a resilient and flexible mat.

2. A floor mat, comprising straps produced from worn automobile tires, an upper and lower plural section of such straps one above the other, the straps in the upper section laid across the straps in the lower section at right angles therewith and the two sets attached together where the straps intersect each other, with the strap in the upper section provided with angular edges and spaced apart from each other to provide scraper corners thereon for cleaning shoes without injury thereto.

JOHN B. KIEFER.